United States Patent Office 3,015,585
Patented Jan. 2, 1962

3,015,585
HEXAFLUOROISOBUTYL SUBSTITUTED SILICON COMPOUNDS
George W. Holbrook and Omar W. Steward, Midland, Mich., assignors to Dow Corning Corporation, Midland, Mich., a corporation of Michigan
No Drawing. Filed Jan. 19, 1959, Ser. No. 787,338
14 Claims. (Cl. 117—161)

The present invention relates to organosilicon compounds in which at least some of the silicon atoms are substituted with $(CF_3)_2CHCH_2$— groups, and to the use of such compounds as oleophobic agents.

The water repelling characteristics of organo-siloxanes are well known, and these materials have been used extensively to render ceramics, masonry, and fibrous materials water repellent. However, the oil repellency of the heretofore employed organosiloxanes is not as good as has been desired. Consequently, it has long been desired to produce organosiloxanes which have the capacity to render surfaces oil repellent without deleteriously affecting the other desirable properties of siloxane treated materials.

It is an object of this invention to provide novel compositions which are useful as oleophobic coating agents or as precursors for producing such agents. Another object is to provide organosiloxane polymeric units which can be incorporated into otherwise conventional organosiloxane resins and rubbers to improve the solvent resistance thereof. Other objects and advantages will be apparent from the following description.

This invention is particularly concerned with monomeric organosilicon compounds having the formula $(CF_3)_2CHCH_2SiHR_nX_{2-n}$ where R is a monovalent hydrocarbon radical free of aliphatic unsaturation, X is selected from the group consisting of hydrogen atoms, alkoxy radicals, and aryloxy radicals, and $n$ is an integer of from 0 to 2 inclusive. This invention is also particularly concerned with the organosiloxanes which can be produced by the hydrolysis and condensation of the aforesaid monomeric compounds, with copolymers containing units derived from such organosiloxanes copolymerized with conventional organosiloxane units, and with articles which have been rendered oleophobic by treatment with such organosiloxanes.

The homopolymeric organosiloxanes of this invention can be either completely condensed polymers or polymers which contain residual uncondensed silanol groups or residual unhydrolyzed alkoxy or aryloxy groups. The preferred homopolymeric organosiloxanes are those of the average general formula

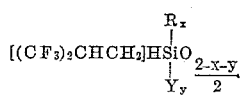

where Y is an alkoxy or hydroxy group, R is as above defined, $x$ has an average value of from 0 to 1 inclusive, $y$ has an average value of from 0 to 0.75 inclusive and the sum of $x+y$ is not greater than 1. The copolymers of this invention are those which contain the above homopolymeric units along with conventional organosiloxane units of the formula

where R' is a monovalent hydrocarbon radical and $z$ is an integer from 0 to 3 inclusive, the average value of $z$ in said copolymer being at least 0.5.

The monomers of this invention in which $n$ is 0 and X is hydrogen can be prepared by reacting hexafluoroisobutylene, i.e. $(CF_3)_2C=CH_2$, with $HSiCl_3$ in the presence of chloroplatinic acid as a catalyst to produce the adduct $(CF_3)_2CHCH_2SiCl_3$, followed by the reaction of the latter with $LiAlH_4$ to replace all of the silicon bonded Cl atoms with H atoms. To produce those compounds in which one or both of the X radicals are alkoxy or aryloxy radicals, $(CF_3)_2CHCH_2SiH_3$ is reacted with one or two molar equivalents, respectively, of the corresponding alcohol or phenolic type compound. The latter reaction can be carried out at from room temperature to any temperature below the decomposition temperature of the reactants, and preferably employs chloroplatinic acid as a catalyst.

The chloroplatinic acid employed in both the addition reactions and the alcoholysis reactions described above is preferably in the form of the more commercially available hexahydrate, i.e. $H_2PtCl_6.6H_2O$. This catalyst is ordinarily employed in an amount sufficient to provide from about $1 \times 10^{-6}$ to $1 \times 10^{-3}$ mol of Pt per mol of the silicon compound. Larger amounts can be used if desired, but are economically less desirable. The catalyst can be used in its pure form if desired, but for greater ease in handling such small amounts it is preferred that a solution be used, for example, a solution of the catalyst in a relatively inert solvent such as dimethyl Carbitol.

The olefin employed in the preparation of the $(CF_3)_2CHCH_2SiCl_3$ is a known compound. It can be prepared, for example, by the steps shown in the following equations. The symbols Me, Et and Ph will be used here and throughout this specification as representative of methyl, ethyl and phenyl radicals respectively.

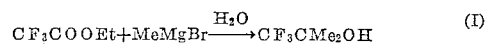

(I) $+P_2O_5 \rightarrow CF_3MeC=CH_2$     (II)

(II) $+Cl_2 \rightarrow MeC(CF_3)ClCHCl_2$     (III)

(III) $+KOH \rightarrow Me(CF_3)C=CCl_2$     (IV)

(V) $+Cl_2 \rightarrow CH_2ClCH(CF_3)_2$     (VI)

(VI) $+KOH \rightarrow CH_2=C(CF_3)_2$

Each of the reactions set forth in the above steps is conventional in the preparation of various halogenated olefins.

Those monomers which contain no more than one R group and either one or two of the alkoxy or aryloxy groups can be hydrolyzed by the conventional techniques for hydrolyzing organosilanes to produce the corresponding siloxanes. It is preferred that the hydrolysis be carried out under either neutral or acidic conditions in order to avoid the cleavage of silicon bonded hydrogen atoms which may be brought about by alkaline conditions.

As is conventional with many organosiloxane systems, when both X groups herein are alkoxy or aryloxy the hydrolysis can be carried out with water insufficient in amount to hydrolyze all of the X groups, thereby producing an organosiloxane which contains residual alkoxy or aryloxy groups. Similar results can be achieved by employing relatively mild hydrolysis conditions even though an excess of water is present, as for example by employing a relatively short contact time between the monomer and the water, and/or a relatively low hydrolysis temperature, and/or less strongly acidic hydrolysis conditions.

It is also conventional in organosiloxane preparations for more or less of the intermediate silanol groups which are formed to undergo condensation, splitting out water to form a siloxane bond. Similar effects are observed in the present invention, and the amount of silanol groups retained can vary as the hydrolysis and condensation conditions range from mild to relatively drastic in regard to reaction temperatures, presence or absence of catalysts, and the type of any condensation catalyst employed.

It is preferred that there be, on the average, no more than 0.75 of the silicon bonded alkoxy, aryloxy or hydroxy groups per silicon atom in the homopolymers and copolymers of this invention. In the average general formula recited above for the homopolymers, fractional values for $x$ and $y$ are possible because of the possible presence of a variety of different units falling within the scope of the defined units.

The R radicals in the monomers and polymers of this invention are monovalent hydrocarbon radicals free of aliphatic unsaturation. Any of such radicals are suitable, and illustrative radicals include alkyl radicals such as methyl, ethyl, cyclohexyl, and octadecyl; aryl radicals such as phenyl, xenyl, and naphthyl; alkaryl radicals such as tolyl and xylyl; and aralkyl radicals such as benzyl. Where two R radicals are present on one Si atom, they can be the same or different. Preferably the R radicals are methyl, ethyl, or phenyl. Monomeric compounds containing one or two of the R radicals can be prepared by reacting the corresponding Grignard reagent or reagents, e.g. RMgCl or RMgBr, with the monoalkoxy or dialkoxy substituted monomers of this invention. The conventional techniques for Grignardizing alkoxysilanes can be employed. Control of the the number of R groups placed upon the silicon atom is obtained either by controlling the ratio of Grignard reagent to silane employed or by the number of alkoxy groups present on the silane reactant.

The most preferred of the alkoxy and aryloxy radicals which may be present in either the monomers or polymers of this invention are methoxy, ethoxy, propoxy, isopropoxy, butoxy, cyclohexyloxy and phenoxy radicals.

The copolymers of this invention can be prepared by cohydrolyzing the above described alkoxy or aryloxy substituted monomers of this invention witht conventional hydrolyzable organosilanes such as $R'_zSiCl_{4-z}$ and $R'_zSi(OC_2H_5)_{4-z}$, where $z$ is an integer of from 0 to 3 inclusive. In such a manner, copolymers can be prepared which contain the conventional $R'SiO_{1.5}$, $R'_2SiO$, $R'_3SiO_{.5}$ or $SiO_2$ units in any proportion and in any combination. If any $SiO_2$ units are incorporated into the copolymer, however, there should be sufficient of the other units present that the average value of $z$ in said copolymer is at least 0.5, and preferably at least 1. The R' radicals can be any monovalent hydrocarbon radicals. Suitable R' radicals include the various illustrative R radicals described above as well as alkenyl radicals such as vinyl, cyclohexenyl, and allyl, and alkynyl radicals such as propynyl. The R' radicals can be the same or different radicals attached to one Si atom or to different Si atoms in the copolymer. The preferred R' radicals are methyl, ethyl, and phenyl. The "conventional" organosiloxane units described above are well known in the literature, and many polymers containing such units are commercially available materials.

The homopolymers of this invention can be either linear or cyclic in nature. The copolymers can be linear, cyclic, or cross-linked in nature. It is to be understood that the copolymers too can contain small amounts of unhydrolyzed Cl or alkoxy groups, or uncondensed hydroxy groups, attached to those silicon atoms which are substituted by R' radicals as well as to those containing the $(CF_3)_2CHCH_2-$ substitution. As little as one mol percent of the $(CF_3)_2CHCH_2-$ substituted siloxane units can be beneficial in the copolymers discussed above, but preferably there is at least 10 mol percent of such units. Where oleophobic properties are sought, it is best that there be at least 75 mol percent of such units.

The siloxanes of this invention are particularly useful as coating agents for base members to render them oil repellent. The preferred siloxanes for this purpose are those containing no R groups and at the most only traces of Y groups. Thus one aspect of the invention lies in the provision of an article comprising a base member coated with a cured organosiloxane which in its uncured state consists essentially of polymeric units of the formula $[(CF_3)_2CHCH_2]HSiO$.

The base members which are most beneficially so coated are, of course, those having a surface which is normally oleophillic, but any base member can be used. The organosiloxanes in question thus can be applied to such diverse materials as those made from glass, ceramics, metal, wood, or fibrous materials such as leather, paper and natural or synthetic textile materials such as wool, cotton, nylon, rayon, Dacron, Orlon, and the like. The compositions can be applied to the base member in any suitable fashion such by dipping, spraying, or brushing. They can be applied as such or in diluted form as in the form of solutions or aqueous emulsions.

Curing catalysts are not absolutely essential in carrying out the "setting" of the siloxane on a base member, for the use of elevated temperatures for a sufficient length of time can accomplish the desired result alone. The sensitivity of some base members to heat, however, and the obvious commercial advantage of a fast cure at as low a temperature as possible, both make it preferable to employ a curing catalyst. Any catalyst or mixture of catalysts which is normally employed for curing SiH containing siloxanes is operative herein. These catalysts are well known and include salts of carboxylic acids such as zinc octoate and dibutyltindiacetate, alkanol amine titanates such as triethanol amine titanate, alkanol amine zirconates such as triethanol amine zirconate, water soluble zirconium compounds such as zirconium acetate and zirconium oxychloride and zirconium or titanium esters of aliphatic alcohols. A preferred catalyst for use herein is the zinc salt of perfluorobutyric acid, i.e.

$$Zn(OCOC_3F_7)_2$$

The metal salt catalysts are ordinarily employed in an amount to provide from about 0.5 to 5% by weight of the metal per se, based on the weight of the siloxane. Any catalyst employed is preferably soluble in the siloxane itself or in a solvent (e.g. water or an organic solvent) which is either miscible or emulsifiable with the siloxane. The solvents and emulsions which are well known in the use of MeHSiO type siloxanes as water repellents are useful in this invention.

After the siloxane has been applied to the base member it is desirable to cure it. This may be done by heating it at an elevated temperature such as from 100 to 150° C. or higher, and/or by aging at room temperature. The time and temperature which are appropriate for an adequate cure are subject to wide variations, and are dependent upon such variables as the specific siloxane employed, type of any catalyst employed, and nature of the base member. Lower temperatures ordinarily require a longer time to achieve a given degree of cure, and the maximum temperature which can be used is controlled largely by the nature of the base member. Obviously the curing conditions must be chosen so as to avoid deterioratioin of the base member or decomposition of the siloxane. In general, the base member will be wetted with the siloxane and then cured until the siloxane is set, i.e., until the siloxane is tightly bonded to the surface of the base member so that it is not readily transferred to other objects by mere contact therewith.

Ordinarily the siloxane will be cured until the treated object has developed substantially an optimum of its desired physical properties, for example until optimum oleophobicity has been attained. Often it is not necessary to continue to heat the treated object to attain the best properties, however. In the treatment of textiles, for example, curing at elevated temperatures for a relatively short time can be followed by aging at room temperature to develop optimum oleophobic properties at minimum expense.

It is to be understood that the siloxane per se can be applied to the base member, or it may be formed in situ by contacting the base member with the alkoxysilanes of this invention. Such silanes can hydrolyze on the surface of the base member to produce the corresponding siloxanes.

The oleophobic articles produced in accordance with this invention can best be defined in terms of being coated with a cured organosiloxane which in its uncured state consists essentially of the hitherto defined polymeric units. This is due to the fact that the silicon-bonded hydrogen atoms are cleaved to a greater or lesser extent during the curing and aging of the siloxane, and the exact form of the cured product cannot be ascertained.

As will be seen from the above description, the major utility of the siloxanes of this invention lies in their use as treating agents to render materials olephobic. This is particularly true of the homopolymeric siloxanes containing no R groups. The homopolymeric disiloxanes containing 1 R group per silicon atom can be used to provide lubricating films upon the surface of articles such as ceramics, glass and glass fibers.

The copolymeric siloxanes of this invention can be made in fluid, resinous, or rubbery form, depending largely upon the average degree of organic substitution per silicon atom in the copolymeric molecule, and such materials can be used as coating, impregnating, or molding resins, lubricating oils, or rubbery gaskets and the like, in the same manner in which conventional organosiloxane fluids, resins and rubbers have been employed.

The major utility of those monomers of this invention which contain alkoxy or aryloxy groups attached to silicon lies in their use as intermediates for the production of the corresponding siloxanes. Those monomers which contain 2 R groups per silicon atom can range from oils to waxes in nature, depending upon the nature of the R groups, and can be used to provide thin lubricating films and oleophobic properties on materials such as ceramics, glass, and glass fibers.

All of the monomers, polymers and copolymers of this invention contain silicon-bonded hydrogen atoms, and thus they are useful as intermediates in the well known SiH addition reactions in which silicon-bonded hydrogen is made to react with materials containing ethylenic unsaturation in the presence of typical vinyl polymerization catalysts such as benzoyl peroxide or other free-radical forming agents such as ionizing radiation. Platinum deposited upon finely divided carbon and chloroplatinic acid are also excellent catalysts in the latter types of reactions and can be used to catalyze the reaction of the SiH containing materials of this invention with, for example, vinyl or allyl substituted silanes or siloxanes. In such a manner the compounds of this invention can be reacted with chlorosilanes or alkoxysilanes containing vinyl substituents in order to produce $-CH_2CH_2Si\equiv$ substituted compounds where from 1 to 3 of the open bonds shown on the Si atom are chlorine atoms or alkoxy radicals. Compounds of the latter type can then undergo the conventional hydrolysis or co-hydrolysis reactions to form new organosiloxane resins and rubbers. In like manner any of the monomers, polymers or copolymers of this invention can undergo SiH addition reactions with unsaturated organic materials such as styrene, ethylacrylate, methylmethacrylate and the like.

The following examples are illustrative only. All parts mentioned are parts by weight unless otherwise specified.

EXAMPLE 1

A mixture of 100 g. $(CF_3)_2C=CH_2$, 327 g. $HSiCl_3$, and 1 ml. of a solution of chloroplatinic acid in dimethyl Carbitol (sufficient to furnish 0.015 g. Pt) was heated in a 1.4 liter bomb for 20 hours at 200° C. The reaction product was distilled to provide the compound $(CF_3)_2CHCH_2SiCl_3$, B.P. 122° C. at 742 mm. Hg, $n_D^{25}$ 1.3661, Cl calculated 35.5%, Cl found 35.6%. A solution of 40.3 g. (0.143 mol) of the latter silane in 50 ml. of dibutyl ether was added over a one hour period at a temperature of about 0° C. to a solution of 5.7 g. (0.15 mol) $LiAlH_4$ in 100 ml. dibutyl ether. The reaction mass was stirred for two hours and 15.1 g. $Et_3SiCl$ was added thereto to react with the excess $LiAlH_4$. The reaction mass was poured into about 200 g. of cracked ice and the dibutyl ether layer was separated from the resulting water layer, dried, filtered, and distilled to provide the compound $(CF_3)_2CHCH_2SiH_3$, B.P. 52° C. at 744 mm. Hg, $n_D^{25}$ 1.3107, $d_4^{25}$ 1.227, silicon bonded H 1.56% (theory 1.54%).

EXAMPLE 2

Dried ethanol in an amount of 14.5 g. (0.314 mol) was added over a two hour period to a mixture of 30.8 g. (0.157 mol) $(CF_3)_2CHCH_2SiH_3$, 150 ml. diethyl ether and 0.5 ml. of a solution of chloroplatinic acid in dimethyl Carbitol (sufficient to provide 0.0006 g. Pt). Hydrogen gas was evolved throughout the addition. The reaction mass was stirred 16 hours and distilled to provide the compound $(CF_3)_2CHCH_2SiH(OC_2H_5)_2$, B.P. 67.5° C. at 38 mm. Hg, $n_D^{25}$ 1.3433, $d_4^{25}$ 1.178, percent C found 33.8 (theory 33.8%).

EXAMPLE 3

A solution of 27.7 g. $(CF_3)_2CHCH_2SiH(OC_2H_5)_2$ in 150 ml. benzene was rapidly added to 150 ml. of 0.12 N HCl. The mass was stirred at reflux temperature for 1 hour, then the benzene layer was separated, washed to neutrality, and all volatiles removed to a temperature of 60° C. at 2 mm. Hg. The resulting oil was a low viscosity material having the properties $n_D^{25}$ 1.3492 and $d_4^{25}$ 1.504. This oil consisted essentially of polymeric units of the formula $[(CF_3)_2CHCH_2]HSiO$ and contained a small proportion of residual unhydrolyzed ethoxy groups.

EXAMPLE 4

A series of solutions was prepared, each solution containing 1.8 parts of a fluid siloxane of the unit formula $[(CF_3)_2CHCH_2]HSiO$, prepared as in Example 3, in 48.5 parts of methylisobutylketone. A catalyst solution was prepared in toluene containing sufficient zinc octoate to provide 10% by weight zinc calculated as the metal and sufficient dibutyltindiacetate to provide 3.8% tin calculated as the metal. To one of the siloxane solutions there was added sufficient of this catalyst solution to provide 2% by weight zinc based on the weight of the siloxane. To a second siloxane solution there was added sufficient of this catalyst solution to provide 4% by weight zinc based on the weight of the siloxane. To a third siloxane solution there was added sufficient of a solution of

$$Zn(OCOC_3F_7)_2$$

to provide 2% by weight zinc based on the weight of the siloxane, along with sufficient dibutyltindiacetate to provide the same ratio of zinc to tin as that existing in the first two solutions. Samples of wool flannel were padded with one of each of the siloxane-catalyst mixtures so prepared, the amount of siloxane picked up in each instance being approximately 1.5% by weight based on the weight of the wool. The wool samples were cured at 250° F. for the times shown in Table I below. They were then tested for oil repellency by placing a drop of mineral oil on each sample and noting both the time required for the oil to start to soak into the fabric and the time required for the oil to completely soak into the fabric. Some of the fabrics were also allowed to stand at room temperature for 5 to 7 days after the 250° F. cure, and were then tested as above described. The results of these tests are shown in Table I below.

Table I

| Catalyst | Pct. Zn Present | Cure, Hours | Aging, Days | Start Soaking, Minutes | Completely Soaked, Min. |
|---|---|---|---|---|---|
| Zn Octoate | 2 | 7.5 | 0 | 1 | ---------- |
| Zn Octoate | 2 | 7.5 | 7 | 14 | 25 |
| Zn Octoate | 4 | 2 | 0 | 8 | 13 |
| Zn Octoate | 4 | 2 | 5 | 58 | 78 |
| Zn(OCOC₃F₇)₂ | 2 | 2 | 0 | 38 | 98 |
| Zn(OCOC₃F₇)₂ | 2 | 2 | 5 | 58 | 150+ |

EXAMPLE 5

Good oil repellency is obtained when the siloxane of Example 3 is applied in accordance with the method of Example 4 to glass, leather, paper, wood, and textiles of cotton, linen, nylon, rayon, "Dacron," and "Orlon."

EXAMPLE 6

When 1 mol of $(CF_3)_2CHCH_2SiH(OC_2H_5)_2$ is added to a suspension on 2 mols MeMgCl in diethyl ether, the resulting product is $(CF_3)_2CHCH_2SiHMe_2$. By employing equimolar amounts of the reactants, a mixture of $(CF_3)_2CHCH_2SiHMe_2$ and $(CF_3)_2CHCH_2SiHMe(OC_2H_5)$ is obtained. Hydrolysis of the latter by the method of Example 3 produces the disiloxane $[(CF_3)_2CHCH_2(Me)HSi]_2O$. The use of PhMgBr in place of the above MeMgCl leads to the production of the corresponding phenyl substituted silanes, and hydrolysis of the $(CF_3)_2CHCH_2SiHPh(OC_2H_5)$ produces the disiloxane $[(CF_3)_2CHCH_2(Ph)HSi]_2O$.

EXAMPLE 7

When an equimolar mixture of $ZHSi(OEt)_2$ and $ZHMeSi(OEt)$ is cohydrolyzed under mild conditions, i.e. by adding it to an excess of cold water containing about 1% by weight of HCl and then washing the hydrolyzate to neutrality without first heating it, a mixture of siloxanes is produced. This mixture contains homopolymers of the unit formula ZHSiO, disiloxanes represented by the following formulas: ZHMeSiOSiMeHZ, ZHMeSiOSiHZ(OEt), and ZHMeSiOSiHZ(OH), as well as endblocked copolymers of the formulas:

ZHMeSiO(ZHSiO)ₓSiHZ(OH)
ZHMeSiO(ZHSiO)ₓSiHZ(OEt)
(EtO)ZHSiO(ZHSiO)ₓSiHZ(OH)
(EtO)ZHSiO(ZHSiO)ₓSiHZ(OEt)
(HO)ZHSiO(ZHSiO)ₓSiHZ(OH)
ZHMeSiO(ZHSiO)ₓSiMeHZ where $x$ is an integer of 1 or more, e.g., from 1 to 100. For simplicity, the symbol Z has been used above to represent the group $-CH_2CH(CF_3)_2$.

EXAMPLE 8

When an equimolar mixture of $ZHPhSi(OEt)$ and $ZHMeSi(OEt)$ is cohydrolyzed, using the hydrolysis and condensation conditions of Example 3, the hydrolyzate contains the disiloxanes $(ZHMeSi)_2O$, $(ZHPhSi)_2O$, and ZHMeSiOSiPhHZ, where Z represents the group $-CH_2CH(CF_3)_2$.

EXAMPLE 9

When the process of Example 2 is repeated, but using phenol in place of ethanol, the compound $(CF_3)_2CHCH_2SiH(OPh)_2$ is obtained.

EXAMPLE 10

When an equimolar mixture of $(CF_3)_2CHCH_2SiH(OEt)_2$, $MeSi(OEt)_3$, $PhSi(OEt)_3$, and $(CH_2=CH)MeSi(OEt)_2$ is diluted with an equal volume of toluene, cohydrolyzed by adding the solution to a tenfold excess of water containing 10% by weight HCl, the mass heated at reflux for 3 hours and the toluene layer separated and washed until neutral, a toluene solution is obtained which contains a resinous copolymer consisting essentially of equimolar proportions of the polymeric units $MeSiO_{1.5}$, $PhSiO_{1.5}$, $(CH_2=CH)MeSiO$, and $[(CF_3)_2CHCH_2]HSiO$. The cohydrolysis, in like manner, of a mixture containing 3 mol percent $Me_3SiCl$ and 97 mol percent $(CF_3)_2CHCH_2SiH(OEt)_2$ produces an end-blocked linear polymer which is a liquid of moderate viscosity and which consists essentially of units of the formulas $Me_3SiO_{.5}$ and $[(CF_3)_2CHCH_2]HSiO$. Likewise the cohydrolysis of an equimolar mixture of $Me_2SiCl_2$ and $(CF_3)_2CHCH_2SiH(OEt)_2$ produces both linear and cyclic copolymers containing the units $Me_2SiO$ and $[(CF_3)_2CHCH_2]HSiO$.

That which is claimed is:

1. A compound having the formula $(CF_3)_2CHCH_2SiHR_nX_{2-n}$ where R is a monovalent hydrocarbon radical free of aliphatic unsaturation, X is selected from the group consisting of hydrogen atoms, alkoxy radicals, and aryloxy radicals, and $n$ is an integer of from 0 to 2 inclusive.

2. A compound of the formula $(CF_3)_2CHCH_2SiHX_2$ where X is selected from the group consisting of hydrogen atoms, alkoxy radicals and aryloxy radicals.

3. A compound of the formula $(CF_3)_2CHCH_2SiH(OEt)_2$ where Et represents an ethyl radical.

4. A compound of the formula $(CF_3)_2CHCH_2SiH_3$.

5. An organosiloxane having the average general formula $$[(CF_3)_2CHCH_2]HSiO_{\frac{2-x-y}{2}} \begin{array}{c} R_x \\ | \\ | \\ Y_y \end{array}$$

where R represents a monovalent hydrocarbon radical free of aliphatic unsaturation, Y is selected from the group consisting of alkoxy and hydroxy groups, $x$ has an average value of from 0 to 1 inclusive, $y$ has an average value of from 0 to 0.75 inclusive, and the sum of $x+y$ is not greater than 1.

6. An organosiloxane consisting essentially of polymeric units of the formula $$[(CF_3)_2CHCH_2]HSiO_{\frac{2-x}{2}} \atop R_x$$

where R is a monovalent hydrocarbon radical free of aliphatic unsaturation and $x$ is an integer of from 0 to 1 inclusive.

7. An organosiloxane consisting essentially of polymeric units of the formula $[(CF_3)_2CHCH_2]HSiO$.

8. A copolymeric organosiloxane in which at least 1 mol percent of the polymeric units are units of the formula $$[(CF_3)_2CHCH_2]HSiO_{\frac{2-x}{2}} \atop R_x$$

where R is a monovalent hydrocarbon radical free of aliphatic unsaturation and $x$ is an integer of from 0 to 1 inclusive, the remaining polymeric units being of the formula $$R'_zSiO_{\frac{4-z}{2}}$$

where R' is a monovalent hydrocarbon radical and $z$ is an integer from 0 to 3 inclusive, the average value of $z$ in said copolymer being at least 0.5.

9. A copolymeric organosiloxane in which at least 1 mol percent of the polymeric units are of the formula $[(CF_3)_2CHCH_2]HSiO$ and the remaining polymeric units are of the formula $$R'_zSiO_{\frac{4-z}{2}}$$

where R' is a monovalent hydrocarbon radical and $z$ is an integer of from 0 to 3 inclusive and has an average value in the copolymer of at least 0.5.

10. An article comprising a base member selected from the group consisting of glass, ceramic, metal, wood, leather, paper, and textile materials, said base member being coated with a cured organosiloxane which in its uncured state consists essentially of polymeric units of the formula $[(CF_3)_2CHCH_2]HSiO$.

11. An article comprising a textile material coated with a cured organosiloxane which in its uncured state consists essentially of polymeric units of the formula $[(CF_3)_2CHCH_2]HSiO$.

12. A method for the production of an oleophobic textile material which comprises wetting a textile material with an organosiloxane oil consisting essentially of polymeric units of the formula $[(CF_3)_2CHCH_2]HSiO$, and thereafter curing the textile material at a temperature and for a time sufficient to set the said organosiloxane oil.

13. A method for the production of an oleophobic textile material which comprises wetting a textile material with a mixture of an organosiloxane oil consisting essentially of polymeric units of the formula $[(CF_3)_2CHCH_2]HSiO$, and an organosiloxane curing catalyst, and thereafter curing the textile material at a temperature and for a time sufficient to set the said organosiloxane oil.

14. An article comprising a fibrous material coated with a cured organosiloxane which in its uncured state consists essentially of polymeric units of the formula $[(CF_3)_2CHCH_2]HSiO$.

References Cited in the file of this patent

McGregor: Silicones and Their Uses, 1954, p. 133, publ. by McGraw-Hill, N.Y.